3,459,649
SYLVITE FLOTATION FROM POTASSIUM-
CONTAINING CRUDE SALTS
Heinz Müller and Engelbert Krempl, Burgkirchen (Alz),
Germany, assignors to Farbwerke Hoechst Aktiengesellschaft vormals Meister Lucius & Bruning, Frankfurt
am Main, Germany, a corporation of Germany
No Drawing. Filed Nov. 2, 1967, Ser. No. 680,018
Claims priority, application Germany, Dec. 24, 1966,
F 51,078
Int. Cl. B03d 1/02
U.S. Cl. 209—166       2 Claims

ABSTRACT OF THE DISCLOSURE

Process for recovering sylvite by flotation from potassium-containing crude salts, wherein alkyl-diamines containing 7 to 22 carbon atoms are used as collectors.

---

It is known from French Patent 1,429,888 and German Patent 1,043,233 that linear primary monoamines having a chain length of 8 to 22 carbon atoms are suitable as flotation reagents for the froth flotation of potassium-containing crude salts. Linear diamines of the general formula $$R-NH-(CH_2)_n-NH_2$$

in which R represents an alkyl radical having from 8 to 22 carbon atoms and $n$ represents an integer from 2 to 4 on the other hand, have no collector action for sylvite.

In contradistinction thereto, we have found that, surprisingly, diamines of the general formula I (I)
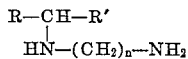

in which R and R' represent saturated or unsaturated, straight-chain or branched alkyl radicals, containing together 7 to 22 carbon atoms, and in which the symbol $n$ represents an integer from 2 to 4, possess an excellent collector action for sylvite especially in brines having a high magnesium content. Among these diamines of the Formula I, those are preferably used as collectors which contain as one of the radicals R and R', a methyl or ethyl group.

The superior collector action of the diamines of the present invention in the flotation of potassium-containing crude salts over the hitherto used monoamines is especially marked when using the diamines for brines which contain more than 3% by weight of magnesium ions. Such brines are obtained during the separation of sylvite by flotation from decomposed carnallite, since they are in most cases floated up from the decomposition brine.

Thus, the object of the present invention is a process for recovering sylvite by flotation from potassium-containing crude salts, especially from magnesium-containing brines, wherein diamines of the Formula I (I)
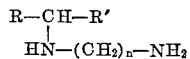

in which $n$ represents an integer from 2 to 4, and R and R' represent saturated or unsaturated, straight chain or branched alkyl radicals containing together about 7 to 22 carbon atoms, or mixtures thereof, are used as collectors.

The diamines used as collectors in the recovery of sylvite by flotation may be prepared according to known methods. They can be obtained, for example, from corresponding monoamines, for example, by adding onto these acrylonitrile and subsequently hydrogenating them or also by reacting these with ethyleneimine, propyleneimine or butyleneimine. The monoamines used as starting substances can be prepared in known manner by the reaction of α-olefines with hydrocyanic acid according to Ritter's reaction (German Patent 870,856 and J. Am. Oil Chemists' Soc., 41, 78–81 (1964)), furthermore by hydrogenation of nitro-paraffins, by hydrogenation of asymmetrical ketones in the presence of ammonia and by the reaction of chloroalkanes with ammonia. Depending on the method of preparation used, the secondary amino group of the diamines of the present invention may be linked to a determined carbon atom of the alkyl chain or it may be distributed satistically over the whole chain. The products of the present invention may constitute bodies that have pure chains or mixtures of chains.

In contradistinction to the hitherto used reagents the diamines of the present invention are liquid substances and exhibit, therefore, many advantages with regard to their manipulation. They may be used in their free form or in the form of their salts. For neutralization, which may be effected stoichiometrically or with a larger or smaller amount, there is especially suitable hydrochloric acid or acetic acid. The optimum degree of neutralization depends on the type of the crude salt used.

The quantity of diamine to be used for the flotation depends on the accompanying minerals of the crude salt as well as on the sylvite content. In general, it is in the range of 20 to 200 g. per ton of crude salt.

The flotation operation to recover sylvite from patassium-containing crude salts, using the diamines of the present invention as collectors, may be carried out according to known processes, for example according to the processes described in the monograph "Potash and Potassium Fertilizers" by Robert Noyes, Noyes Development Corporation, Park Ridge, N.J., U.S.A. (1966), pages 80 to 82 and 84 to 88. During flotation, there may also be used in known manner so-called frothers for improving the flotation effect and, if necessary, for modifying the froth. As such frothers, there may be mentioned, for example, cresols and xylenols (cresylic acids) and primary or secondary aliphatic and alicyclic alcohols containing about 4 to 10 carbon atoms, such as pentanols, hexanols, and especially methyl isobutyl carbinol (MIBC), and furthermore polyalkylene glycols having molecular weights of up to about 600. Under polyalkylene glycols, there are to be understood in the present case compounds resulting from the addition of alkylene oxides to aliphatic alcohols as block polymers such, for example, as polypropylene glycol, onto which the ethylene oxide had been added.

So-called depressants which prevent the flotation concentrate from enriching with slime components may also be used simultaneously. Such known depressants are described, for example, on page 102 of the above-mentioned monograph by Robert Noyes. The depressants essentially consist of colloidal substances such as cellulose ether, starch, guar flour, glue, polyacryloamides, and similar substances.

For the flotation according to the present invention, even other flotation auxiliary agents may be added, for example, hydrocarbon oils (fuel oil, gas oil, kerosene) or other auxiliary agents.

The advantageous effect of the diamines used according to the present invention for the flotation of potassium-containing crude salts does not only set in when the mentioned diamines or mixtures of these diamines are used alone as collectors, but these advantageous effects can also be observed when the diamines are used together with the monoamines hitherto employed as collectors. When such mixtures of diamines and monoamines are used, the proportion of the diamines in the mixture should amount to at least 30 percent by weight.

The following examples illustrate the invention but they are not intended to limit it thereto. The percentages indicated in these examples are percentages by weight.

EXAMPLE 1

In tests to demonstrate the recovery efficiency of various collectors, samples of a pulp prepared from 100 g. of sylvite and 0.5 l. of brine were conditioned for 3 minutes with the amines indicated in the following Table 1 in form of their hydrochlorides and subsequently subjected to flotation in a laboratory flotation cell. The brine had a specific gravity of 1.294 and the following composition:

|    | G./l. |
|---|---|
| Mg | 97.8 |
| K | 2.8 |
| Na | 3.7 |
| Cl | 305.6 |
| $SO_4$ | 0.6 |

The amine collectors were added in quantities of 50, 75 and 100 g. respectively, of amine per ton of sylvite, in form of aqueous solutions having a strength of 2%.

EXAMPLE 2

Samples of a crude salt having the following mean composition:

|    | Percent |
|---|---|
| KCl | 28 |
| NaCl | 60 |
| $MgCl_2$ | 7 |
| $MgSO_4$ | 2 |
| Insoluble matter | 3 | were deslimed by treating them four times with a brine. The samples of the crude salt treated in this manner were then subjected, as described in Example 1, to flotation, with the addition of amines and diamines.

The brine had the following composition:

|    | G./l. |
|---|---|
| Mg | 82.8 |
| K | 16.6 |
| Na | 13.3 |
| Cl | 250.2 |
| $SO_4$ | 4.0 |

The amines were added in quantities of each time 100 g. per ton of sylvite. In addition, 60 g. of pine oil and 10 g. of starch per ton of sylvite were added. The collectors employed and the recoveries of the flotation operations are listed in Table 2.

TABLE 2

| Collector | R | Feed concentrate, percent | | Recovery of $K_2O$ in percent | Tail, percent | |
|---|---|---|---|---|---|---|
| | | By weight | $K_2O$ content | | By weight | $K_2O$ content |
| Stearylamine, R—$NH_2$ | $C_{16}$-$C_{18}$ | 10 | 45 | 25.4 | 90 | 14.7 |
| Oleylamine, R—$NH_2$ | $C_{18}$ | 3 | 40 | 7.7 | 97 | 17.0 |
| Tallow fat amine, R—$NH_2$ | $C_{14}$-$C_{18}$ | 12 | 48 | 32.5 | 88 | 13.5 |
| Diamine R—$CH_2$—$CH_3$ / HN—$(CH_2)_3NH_2$ | $C_{15}$ | 24 | 57 | 72.2 | 76 | 5.3 |
| Diamine R—$CH_2$—$CH_3$ / HN—$(CH_2)_3NH_2$ | $C_{17}$ | 26 | 58 | 85.2 | 74 | 3.6 |
| Diamine R—CH—$CH_2$—$CH_3$ / HN—$(CH_2)_3$—$NH_2$ | $C_{11}$-$C_{15}$ | 23 | 54 | 70.3 | 77 | 6.7 |

TABLE 1

| Collector | R | Collector rate in percent | Recovery in percent upon addition of g. of collector per ton of sylvite | | |
|---|---|---|---|---|---|
| | | | 100 | 75 | 50 |
| Stearylamine, $RNH_2$ | $C_{10}$-$C_{18}$ | 100 | 30 | 15 | 10 |
| Tallow fat amine, $RNH_2$ | $C_{14}$-$C_{18}$ | 100 | 68 | 60 | 40 |
| Diamine R—CH—$CH_3$ / NH—$(CH_2)_3NH_2$ | $C_{14}$ | 100 | 95 | 86 | 70 |
| Diamine R—CH—$CH_3$ / NH—$(CH_2)_4NH_2$ | $C_{15}$ | 100 | 98 | 90 | 78 |
| Diamine R—CH—$CH_2$.$CH_3$ / NH—$(CH_2)_3NH_2$ | $C_{16}$ | 100 | 98 | 93 | 76 |
| Stearylamine, $RNH_2$ | $C_{10}$-$C_{18}$ | 60 | 90 | 85 | 75 |
| Diamine R—CH—$CH_3$ / NH—$(CH_2)_3NH_2$ | $C_{18}$ | 40 | | | |
| Stearylamine, $RNH_2$ | $C_{10}$-$C_8$ | 50 | 96 | 90 | 74 |
| Diamine R—CH—$CH_3$ / NH—$(CH_2)_3$—$NH_3$ | $C_{15}$-$C_{20}$ | 50 | | | |
| Stearylamine, $RNH_2$ | $C_{10}$-$C_{18}$ | 30 | 94 | 87 | 70 |
| Diamine R—CH—$CH_3$ / NH—$(CH_2)_3$—$NH_2$ | $C_{15}$ | 70 | | | |
| Diamine R—CH—$CH_3$ / NH—$(CH_2)_2$—$NH_2$ | $C_{16}$-$C_{18}$ | 100 | 91 | 78 | 65 |

The fatty amines used for comparison had the following chain distribution:

| | $C_{14}$ | $C_{16}$ | $C_{18}$* | $C_{18}$** |
|---|---|---|---|---|
| Stearylamine | 4 | 30 | 63 | 3 |
| Oleylamine | | | 10 | 90 |
| Tallow fat amine | 6 | 25 | 24 | 45 |

*Stearyl. **Oleyl.

The above Tables 1 and 2 clearly show that the collectors of the present invention have a far better effect than the known collectors. The action of the fatty amines can be considerably improved when they are combined with the diamines of the present invention. Very surprising is the very good recovery of potassium chloride with simultaneous excellent selectivity, which brings about the high $K_2O$ contents in the flotation concentrates.

We claim:

1. Process for recovering sylvite by froth flotation from potassium-containing crude salts, comprising utilizing as a collector at least one compound of the formula

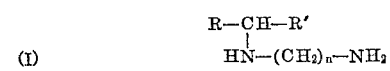

(I)

in which $n$ represents an integer from 2 to 4, and R and R′ represent saturated or unsaturated, straight chain or branched alkyl radicals containing together 7 to 22 carbon atoms; and (II) 0–70% by weight of a primary alkylamine having 8–22 carbon atoms; and separating the sylvite from the froth.

2. Process as claimed in claim 1, wherein the collectors are used in a quantity of from 20 to 200 g./ton crude salt.

References Cited

UNITED STATES PATENTS

| | | | |
|---|---|---|---|
| 3,260,365 | 7/1966 | Dickson | 209—166 |
| 3,404,777 | 10/1968 | Ray et al. | 209—166 |
| 2,166,150 | 7/1939 | Mowk | 209—166 X |
| 2,329,149 | 9/1943 | Weiner | 209—166 |

OTHER REFERENCES

Chem. Abstracts, vol. 54, 1960.

HARRY B. THORNTON, Primary Examiner